United States Patent
Sandell

(10) Patent No.: US 9,503,287 B2
(45) Date of Patent: Nov. 22, 2016

(54) SIGNAL PROCESSING METHOD AND APPARATUS

(71) Applicant: KABUSHIKI KAISHA TOSHIBA, Tokyo (JP)

(72) Inventor: Magnus Stig Torsten Sandell, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/780,099

(22) PCT Filed: Mar. 27, 2013

(86) PCT No.: PCT/GB2013/050805
§ 371 (c)(1),
(2) Date: Sep. 25, 2015

(87) PCT Pub. No.: WO2014/155026
PCT Pub. Date: Oct. 2, 2014

(65) Prior Publication Data
US 2016/0043884 A1    Feb. 11, 2016

(51) Int. Cl.
*H04L 25/02* (2006.01)
*H04L 27/26* (2006.01)
(Continued)

(52) U.S. Cl.
CPC ............ *H04L 25/0242* (2013.01); *G06F 17/10* (2013.01); *G06T 5/002* (2013.01);
(Continued)

(58) Field of Classification Search
CPC ...... H04N 19/97; H04N 19/85; H04N 5/357; G06K 9/6249; G06K 9/6244; H04L 25/0242; H04L 27/2601; G06T 11/006; G06T 17/00; G06T 7/0065; G06T 2200/21; G06T 2207/10052; G06T 2211/424; H03M 7/3062; H03M 7/6047; H04B 1/16
USPC ........................................................ 348/241
See application file for complete search history.

(56) References Cited

U.S. PATENT DOCUMENTS 8,396,310 B1 * 3/2013 Kadambe ............. G06K 9/6244
                                                    348/404.1
8,885,893 B1 * 11/2014 Estabridis ............ G06K 9/4671
                                                    382/118

(Continued)

OTHER PUBLICATIONS

Davenport, Mark et al., Analysis of Orthogonal Matching Pursuit Using the Restricted Isometry Property, Sep. 2010, IEEE Transactions on Information Theory, vol. 56, No. 9, pp. 4395-4401.*

(Continued)

*Primary Examiner* — Pritham Prabhakher
(74) *Attorney, Agent, or Firm* — Finnegan, Henderson, Farabow, Garrett & Dunner LLP

(57) ABSTRACT

In an embodiment a method of estimating a sparse signal from a measured signal using a transform matrix is disclosed. The method comprises determining a partial contribution to the sparse signal; determining a residual by subtracting the partial contribution from the measured signal; and iteratively determining further contributions to the sparse signal. An iteration comprises: identifying a first candidate column of the transform matrix, the first candidate column being the column of the transform matrix which is most correlated with the residual at the start of the iteration; calculating a condition indicator, the condition indicator being an indication of the condition of a matrix formed by columns of the transform matrix selected in previous iterations and the first candidate column; comparing the condition indicator with a threshold; if the condition indicator is above the threshold selecting the first candidate column as a selected candidate column; if the condition indicator is below the threshold, identifying a second column of the transform matrix as a second candidate column and selecting the second candidate column as the selected candidate column; determining a contribution to the sparse signal for the iteration from the selected candidate column; and calculating a new residual by subtracting the contribution to the sparse signal for the iteration from the residual at the start of the iteration.

20 Claims, 6 Drawing Sheets

(51) Int. Cl.
G06F 17/10 (2006.01)
G06T 5/00 (2006.01)
H04N 5/357 (2011.01)

(52) U.S. Cl.
CPC .......... *H04L27/2601* (2013.01); *H04N 5/357* (2013.01); *G06T 2200/21* (2013.01); *G06T 2207/10052* (2013.01)

(56) References Cited

U.S. PATENT DOCUMENTS

| | | | |
|---|---|---|---|
| 2006/0239336 A1 | 10/2006 | Baraniuk et al. | |
| 2012/0213270 A1* | 8/2012 | Baraniuk | H04L 25/20 375/240.01 |
| 2013/0093957 A1* | 4/2013 | Baraniuk | H04N 9/67 348/659 |

OTHER PUBLICATIONS

Baraniuk, Richard, Compressive Sensing, Jul. 2007, Lecture Notes in IEEE Signal Processing Magazie, vol. 24, pp. 1-9.*

Chartrand et al., Iteratively Reweighted Algorithms for Compressive Sensing, Mar. 31, 2008-Apr. 4, 2008, 2008 IEEE International Conference on Acoustics, Speech and Signal Processing, pp. 3869-3872.*

International Preliminary Report on Patentability and Written Opinion issued by The International Bureau of WIPO on Sep. 29, 2015, for International Application No. PCT/GB2013/050805.

Nair et al., "Some Greedy Learning Algorithms for Sparse Regression and Classification with Mercer Kernels," Journal of Machine Learning Research (Jan. 3, 2003), 3:781-801, XP055084801.

Sun et al., "Efficient Incremental Analysis of On-Chip Power Grid via Sparse Approximation," Design Automation Conference (Jun. 5, 2011), pp. 676-681, XP031927795.

Karabulut et al., "Sparse Channel Estimation using Orthogonal Matching Pursuit Algorithm," Vehicular Technology Conference (Sep. 26, 2004), 6:3880-84, XP010790147.

Bartuschat et al., "An Orthogonal Matching Pursuit Algorithm for Image Denoising on the Cell Broadband Engine," Parallel Processing and Applied Mathematics (Sep. 13, 2009), pp. 557-566, XP019146924.

Tropp et al., "Computational Methods for Sparse Solution of Linear Inverse Problems," Proceedings of the IEEE (Jun. 2010), 98:948-958, XP011308338.

* cited by examiner

SIGNAL PROCESSING METHOD AND APPARATUS

FIELD

Embodiments described herein relate generally to signal processing methods and apparatus.

BACKGROUND

Compressed sensing is a technique that is applied to many areas of signal processing. Compressed sensing involves acquiring and reconstructing a signal by finding solutions to underdetermined linear systems. An important aspect of compressed sensing is the estimation of sparse signals, i.e., signals that can be represented by only a few coefficients in some basis. An algorithm for recovering and estimating sparse signals is Orthogonal Matching Pursuit (OMP). It is based on finding the sparse coefficients sequentially by looking at the residual after all previous coefficients' contributions have been subtracted.

BRIEF DESCRIPTION OF THE DRAWINGS

In the following, embodiments will be described with reference to the accompanying drawings in which.

DETAILED DESCRIPTION

Figure 1:
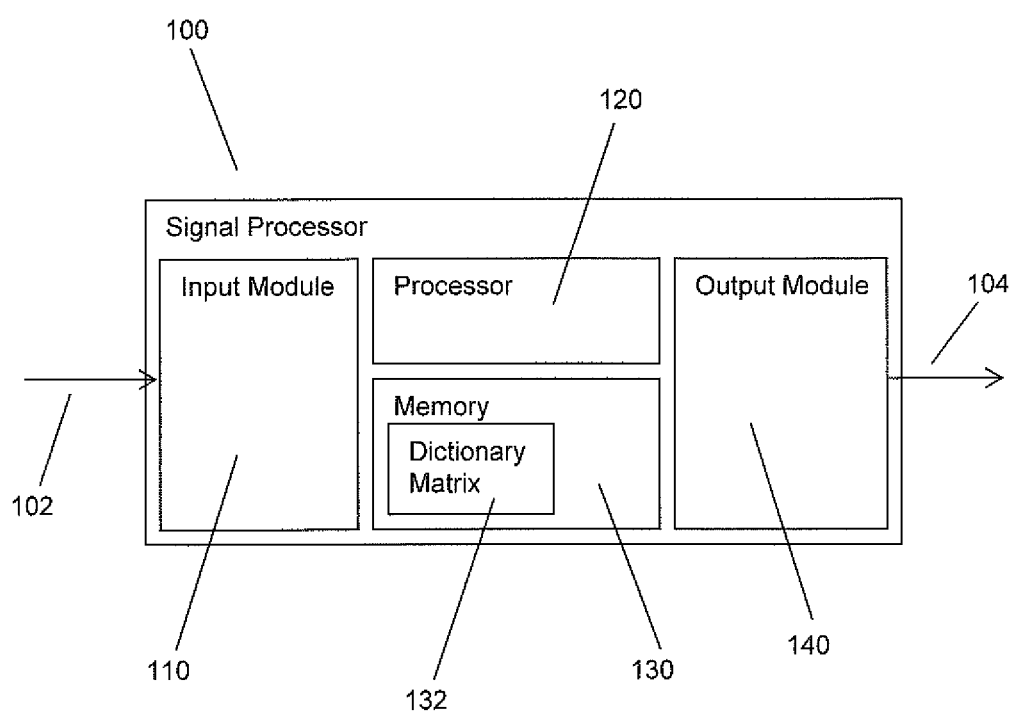
FIG. 1 shows a signal processor according to an embodiment.

In an embodiment a method of estimating a sparse signal from a measured signal using a transform matrix is disclosed. The method comprises determining a partial contribution to the sparse signal; determining a residual by subtracting the partial contribution from the measured signal; and iteratively determining further contributions to the sparse signal. An iteration comprises: identifying a first candidate column of the transform matrix, the first candidate column being the column of the transform matrix which is most correlated with the residual at the start of the iteration; calculating a condition indicator, the condition indicator being an indication of the condition of a matrix formed by columns of the transform matrix selected in previous iterations and the first candidate column; comparing the condition indicator with a threshold; if the condition indicator is above the threshold selecting the first candidate column as a selected candidate column; if the condition indicator is below the threshold, identifying a second column of the transform matrix as a second candidate column and selecting the second candidate column as the selected candidate column; determining a contribution to the sparse signal for the iteration from the selected candidate column; and calculating a new residual by subtracting contribution to the sparse signal for the iteration the from the residual at the start of the iteration.

In an embodiment identifying a second candidate column comprises identifying a column of the transform matrix having a condition indicator which is above the threshold.

In an embodiment identifying a first candidate column comprises calculating a measure of correlation with the residual for a plurality of columns of the transform matrix and ranking the columns of the plurality of columns according to the measure of correlation and identifying a second candidate column comprises selecting a second column from the ranked columns.

In an embodiment determining a contribution to the sparse signal for the iteration comprises decomposing a matrix comprising the selected columns into an orthogonal matrix and an upper triangular matrix.

In an embodiment the condition indicator is calculated from the norm of the projection of the candidate column onto the null space of the selected columns.

In an embodiment the method further comprises determining if a stopping criterion has been met and if the stopping criterion has been met, outputting the sparse signal.

In an embodiment a method of estimating channel as a set of time domain taps from a signal received over the channel is disclosed. The measured signal is the signal received over the channel and the sparse signal is the set of time domain taps.

In an embodiment a method of processing a measured signal from a sensor is disclosed. The method comprises receiving the measured signal from the sensor; processing the measured signal to estimate a sparse signal; and outputting the sparse signal.

In an embodiment the sensor is a photo detector and the transform matrix is determined from a light field being imaged by the photo detector.

In an embodiment an image de-noising method comprises the method of estimating a sparse signal from a measured signal using a transform matrix.

In an embodiment the image de-noising method further comprises determining the transform matrix from an image or image patch.

In an embodiment signal processing apparatus comprises an input module configured to receive a measured signal; an output module configured to output a sparse signal; a memory configured to store a transform matrix; and a processor configured to estimate the sparse signal from the measured signal by: determining a partial contribution to the sparse signal; determining a residual by subtracting the partial contribution from the measured signal; and iteratively determining further contributions to the sparse signal. An iteration comprises identifying a first candidate column of the transform matrix, the first candidate column being the column of the transform matrix which is most correlated with the residual at the start of the iteration; calculating a condition indicator, the condition indicator being an indication of the condition of a matrix formed by columns of the transform matrix selected in previous iterations and the first candidate column; comparing the condition indicator with a threshold; if the condition indicator is above the threshold selecting the first candidate column as a selected candidate column; if the condition indicator is below the threshold, identifying a second column of the transform matrix as a second candidate column and selecting the second candidate column as the selected candidate column; determining a contribution to the sparse signal for the iteration from the selected candidate column; and calculating a new residual by subtracting contribution to the sparse signal for the iteration the from the residual at the start of the iteration.

In an embodiment the input module is configured to receive an indication of a signal received over a communication channel, and the processor is configured to determine a set of time domain taps as the sparse signal.

In an embodiment a base station comprises the signal processing apparatus.

In an embodiment a mobile station comprises the signal processing apparatus.

In an embodiment an imaging apparatus comprises a single pixel sensor configured generate a signal depending on a light field originating from a selection of locations on a subject; and the signal processing apparatus. The signal processing apparatus is configured to receive the signal generated by the single pixel sensor.

In an embodiment the imaging apparatus further comprises a spatial light modulator configured to modulate the light field received by the single pixel sensor.

In an embodiment an image processing system comprises the signal processing and the input module is operable to receive an input image and the processor is operable to de-noise the input image.

In an embodiment the processor is further operable to determine the transform matrix from the input image or an image patch of the input image.

The described embodiments can be incorporated into a specific hardware device, a general purpose device configure by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

FIG. 1 shows a signal processor 100 according to an embodiment. The signal processor 100 comprises an input module 110, a processor 120, a memory 130, and an output module 140. The input module 110 is configured to receive an input signal 102. The input signal 102 comprises a measured signal which may be considered as a measurement vector comprising a plurality of measured values.

The memory 130 stores a dictionary matrix 132. The dictionary matrix 132 comprises a plurality of columns. The columns of the dictionary matrix represent atoms or building blocks of a signal such that any sparse signal is a linear combination of the columns of the dictionary matrix. The dictionary matrix may be considered as a transform matrix. The processor 120 is configured to execute a method of estimating a sparse signal from the input signal 102 and the dictionary matrix 132. The sparse signal is representation of the input signal as a set of coefficients for the columns of the dictionary matrix 132. The output module 140 then outputs the set of coefficients as the output signal 104.

In an embodiment the dictionary matrix 132 is determined based on properties of the sensor that provides the input signal 102 such that the set of coefficients of columns of the dictionary matrix 132 is sparse.

For example, in an embodiment, the input signal is an image signal. It is known that natural images tend to be compressible in the discrete cosine transform and wavelet bases. Therefore, the dictionary matrix may transform an input image signal onto the discrete cosine transform or wavelet bases.

In an embodiment the input signal is the frequency response of a channel in an orthogonal frequency division multiplexing communication system. In this embodiment, the dictionary matrix is a transform to a time domain basis and the output signal is a set of coefficients representing time domain taps.

Figure 2:
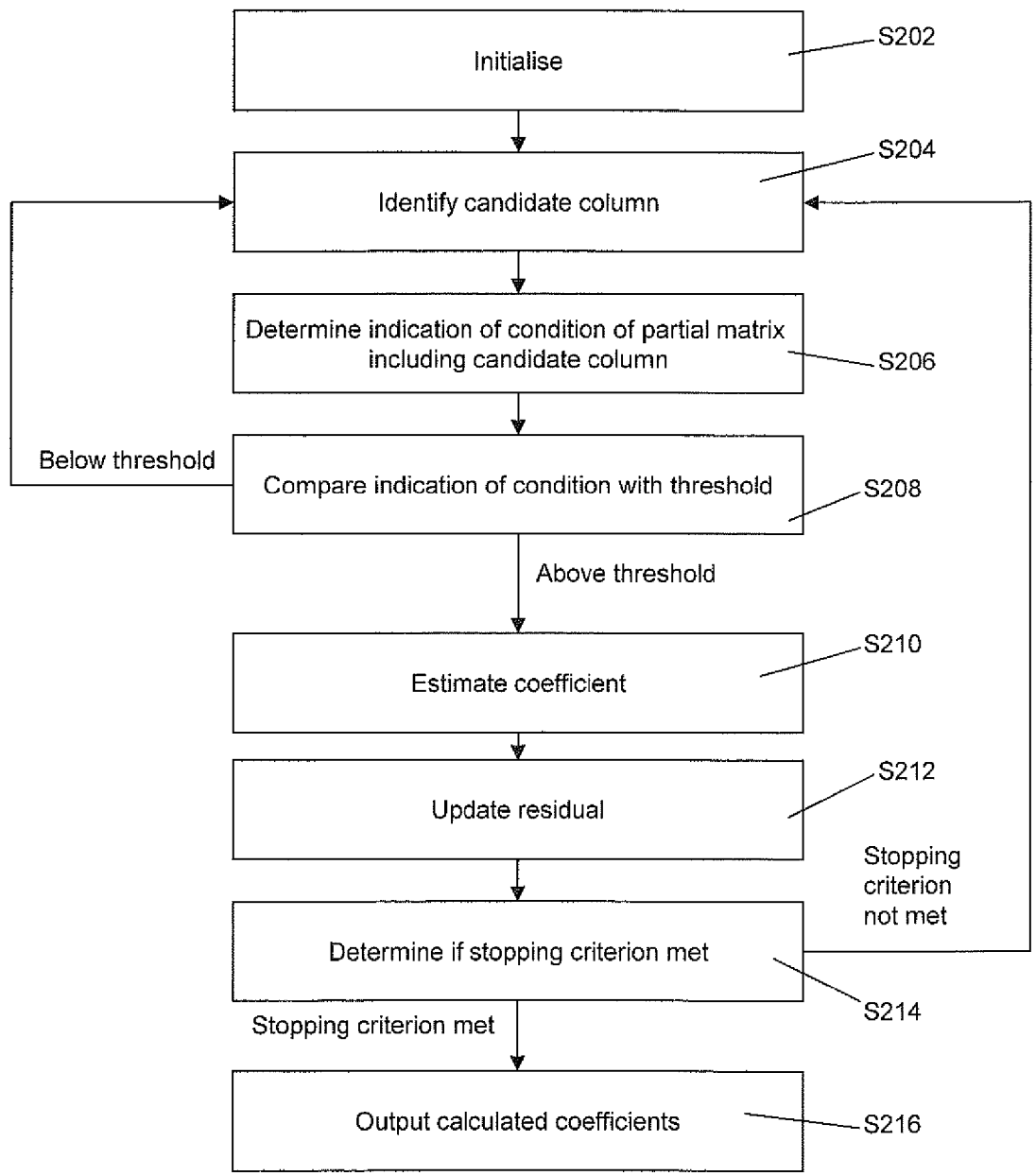
FIG. 2 shows a signal processing method according to an embodiment.

In an embodiment, the dictionary matrix is determined from the input signal. In an embodiment, the input signal is a measured image signal which includes image noise. The processor 120 executes a method of determining coefficients for columns of the dictionary matrix 132. Methods of embodiments are described below with reference to FIGS. 2 and 3.

In an embodiment, the coefficients for columns of the dictionary matrix are determined according to a matching pursuit algorithm. This is described in relation to FIG. 2.

The task may be formulated as follows. Let $$y=Ax+v$$

where $y,v \in C^N, A \in C^{N \times M}, x \in C^M$. y is the measured signal, A is the dictionary matrix, x is the sparse signal to be calculated and v represents a norm error. The aim of the following algorithm is to calculate the sparse signal x and minimise the norm error v.

If x is sparse, i.e., only T<<M elements of x are nonzero, it can be estimated efficiently with a matching pursuit algorithm such as orthogonal matching pursuit (OMP).

In step S202, an index set $\Omega$ is initialised and the residual r is set to the input measured vector y: step S202 may be written as follows:

$$\Omega=\{\ \}, r=y.$$

The index set $\Omega$ represents the indices columns of the dictionary matrix that have been selected as contributing to the sparse signal.

In step S204, a candidate column of the dictionary matrix A is identified. The candidate column is identified as the column of A which has the largest projection onto the residual. Accordingly, step S204 may be written as identifying the column i such that:

$$i = \operatorname*{argmax}_{m} |(A^H r)_m|$$

Where H indicates the conjugate transpose of the dictionary matrix A and m is an index.

In step S206, an indication of the condition of a partial matrix $A_\Omega$ including the candidate column i is calculated. One problem with matching pursuit algorithms is that the partial matrix $A_\Omega$ might be ill-conditioned when a new column is chosen. This means that the noise v in the observation y will be enhanced, giving a poor estimate of x. This problem is solved by checking whether or not a new column will produce an ill-conditioned matrix $A_\Omega$.

Here it is assumed that the indication of condition is high for a well conditioned matrix and low for a poorly conditioned matrix. For example, the indication of condition may be considered as inversely related to the condition number of the matrix since matrices with a high condition number are considered to be ill-conditioned. When a matrix is ill-conditioned, a small change in the argument can result in a large change in the solution.

In step S208, the indication of condition calculated in step S206 is compared with a threshold. If the indication of condition is above the threshold, then the candidate column is selected as part of the sparse signal and the method moves to step S210. If the indication of condition is below the threshold, the candidate column is rejected and the method returns to step S204 where a new candidate column is selected.

If the candidate column is selected, the index i of the candidate column is added to the set $\Omega$:

$$\Omega \leftarrow \Omega \cup i$$

If the candidate column is rejected, the index of the candidate column may be added to a set of excluded columns $\tilde{\Omega}$:

$$\tilde{\Omega} \leftarrow \tilde{\Omega} \cup i$$

Then in step S204, the candidate column is selected from a set of columns excluding $\tilde{\Omega}$:

$$i = \underset{m \notin \tilde{\Omega}}{\mathrm{argmax}} |(A^H r)_m|$$

In step S210, the set of coefficients $\hat{x}_\Omega$ for the columns selected so far are selected as the set that best approximates the signal y:

$$\hat{x}_\Omega = \underset{u}{\mathrm{argmin}} \|y - A_\Omega u\|$$

In step S212, the residual r is updated by subtracting the contributions of the selected columns from the signal y:

$$r = y - A_\Omega \hat{x}_\Omega$$

Where the subscript $\Omega$ indicates the elements corresponding to the indices in $\Omega$, i.e., $A_\Omega$ is a $N \times |\Omega|$ matrix and $\hat{x}_\Omega$ is a $|\Omega| \times 1$ vector. Hence $\hat{x}_\Omega$ is an estimate of the nonzero elements in x.

In step S214 it is determined whether a stopping criterion has been met. The stopping criterion may specify a threshold for the norm of the residual, or a number of iterations.

If the stopping criterion is met, in step S216 the set of calculated coefficients is output. If the stopping criterion is not met, the method returns to step S204 and a new candidate column is selected.

In an embodiment, the maximum operation in step S204 can be replaced by a sorting of the elements instead. That way a new maximum does not have to be recomputed if a column is rejected, the next element in the sorted list is chosen instead.

Although the OMP algorithm aims at maximising the power of the estimated sparse signal, it may lead to noise enhancement and numerical problems. It could happen that the locations of the sparse coefficients are such that the following least-squares estimate of their magnitudes is severely hampered by an ill-conditioned matrix.

In embodiments, the problems of ill-conditioned matrices in matching pursuit are overcome by discarding a selected column i if its projection onto the null space of the already selected columns is very small. Although a "weaker" column would be selected from a sparse signal point of view, this is outweighed by the advantage of having a better conditioned matrix. Better estimation of sparse signals can be obtained by discarding selected columns of the system matrix when using matching pursuit algorithms such as orthogonal matching pursuit (OMP). The resulting matrix is better conditioned which results in better overall performance.

In an embodiment, the complexity of the method shown above may be reduced by calculating the inverse in the estimation step S206 using the QR decomposition.

Figure 3:
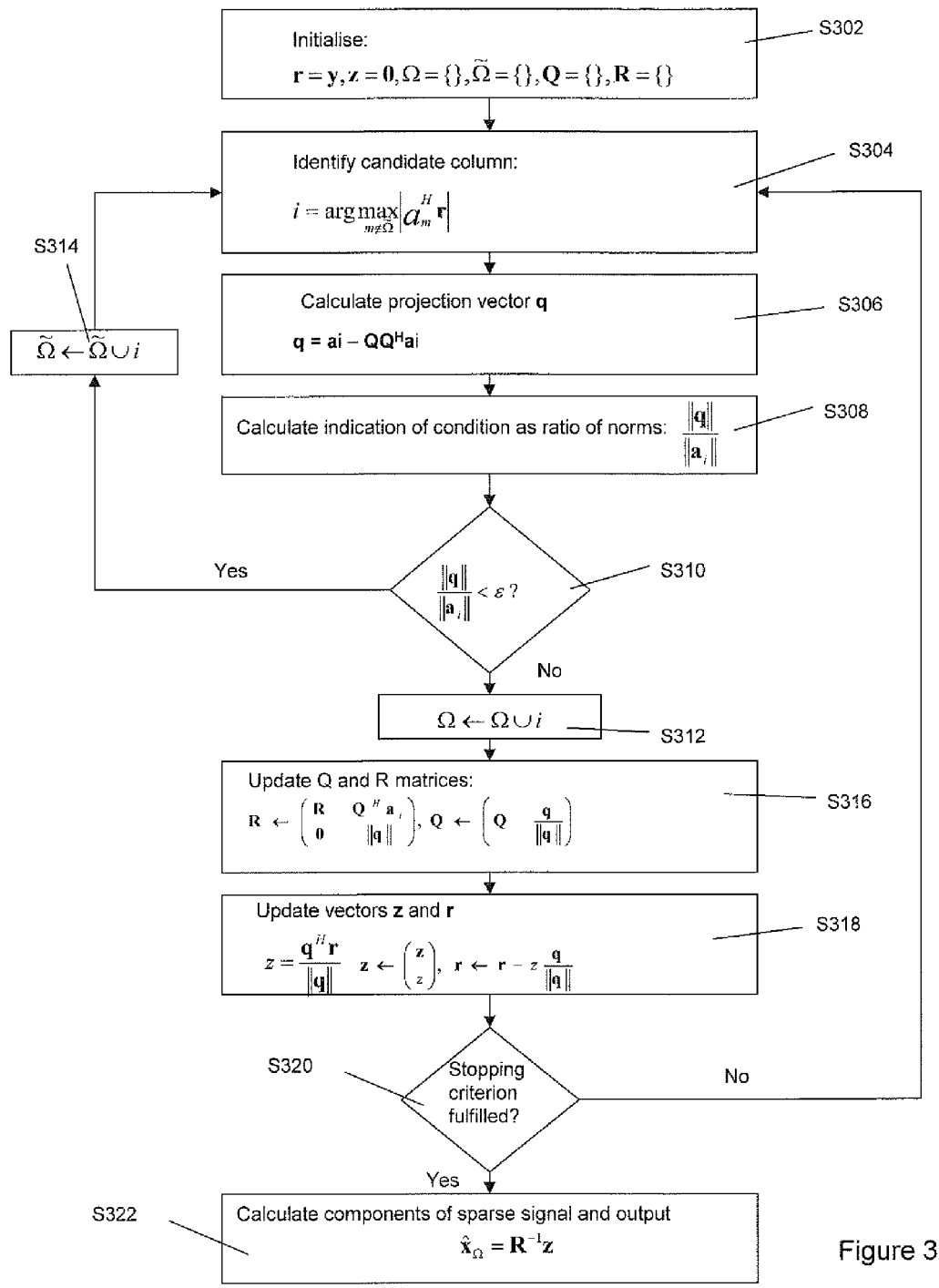
FIG. 3 shows a signal processing method according to an embodiment.

FIG. 3 shows a method of estimation of a sparse signal from a measured signal using the QR decomposition.

In the QR decomposition, the matrix $A_\Omega$ is maintained as a QR factorisation of an orthogonal matrix Q and an upper triangular matrix R. This then means that only need the Q and R matrices need to be updated recursively, which reduces the complexity.

In step S302, the residual r, a vector z, the set of indices of the selected columns $\Omega$, the set of indices of rejected columns $\tilde{\Omega}$, the orthogonal matrix Q and the upper triangular matrix R are initialised as follows:

$$r = y, z = 0, \Omega = \{\}, \tilde{\Omega} = \{\}, Q = \{\}, R = \{\}$$

Where the vector z represents a rotated version of the observation using the chosen columns of the Q matrix. The vector z needs to be inverted at the end of the method to create $\hat{x}_\Omega$ which is the estimate of the signal.

In step S304, the column i having the largest projection onto the residual r is identified as a candidate column:

$$i = \underset{m \notin \tilde{\Omega}}{\mathrm{argmax}} |a_m^H r|$$

The columns rejected in previous iterations, that is the columns having indices in the set $\tilde{\Omega}$, are excluded from the selection in step S304.

In step S306, a vector q which is the projection onto the null space of Q is calculated as follows:

$$q = a_i - QQ^H a_i$$

Where H indicates the conjugate transpose.

In step S308, the norm of q is compared with the norm of a vector a formed by the candidate column of the dictionary matrix by calculating the following ratio:

$$\frac{\|q\|}{\|a_i\|}$$

As described above, one problem with OMP is that the partial matrix $A_\Omega$ might be ill-conditioned when a new column is chosen. This means that the noise v in the observation y will be enhanced, giving a poor estimate of x. This problem can be addressed by checking whether or not a new column will produce an ill-conditioned matrix $A_\Omega$. Although there is not a one-to-one relationship between the smallest diagonal value of R and the condition number of $A_\Omega$, it can be used as a discriminator. If the column $a_i$ is almost linearly dependent on the columns in the Q matrix, the projection onto the null space will be very small. This is the q vector, so if the norm of the q vector is small compared to the norm of $a_i$, this indicates that the new $A_\Omega$ matrix will be poorly conditioned. The above ratio is the indication of the condition of the matrix including the candidate column In step S310, the ratio calculated in step S308 is compared with a threshold $\epsilon$.

If the ratio is above the threshold $\epsilon$, then in step S312, the candidate column is selected and the index i is added to the set of selected columns $\Omega$:

$$\Omega \leftarrow \Omega \cup i$$

The method then moves to step S316.

If the ratio is below the threshold $\epsilon$, then in step S314 the candidate column is rejected, and the index i of the candidate column may be added to a set of excluded columns $\tilde{\Omega}$:

$$\tilde{\Omega} \leftarrow \tilde{\Omega} \cup i$$

The method then returns to step S304.

In step S316, the Q and R matrices are updated as follows:

$$R \leftarrow \begin{pmatrix} R & Q^H a_i \\ 0 & \|q\| \end{pmatrix}, Q \leftarrow \begin{pmatrix} Q & \frac{q}{\|q\|} \end{pmatrix}$$

In step S318, the projection z of the direction of the vector q onto the residual is calculated as follows:

$$z = \frac{q^H r}{\|q\|}$$

The vector z is then updated with the projection and a new residual is calculated:

$$z \leftarrow \begin{pmatrix} z \\ z \end{pmatrix}, r \leftarrow r - z \frac{q}{\|q\|}$$

In step S320, it is determined if a stopping criterion has been met. If the stopping criterion has been met, the method proceeds to step S322. If the stopping criterion has not been met the method returns to step S304 and a new candidate column is determined.

In step S322, the vector $\hat{x}_\Omega$ of components of the sparse signal is calculated from the inverse of the matrix R and the vector z as follows:

$$\hat{x}_\Omega = R^{-1} z$$

Then the vector $\hat{x}_\Omega$ is output. Since R is an upper triangular matrix the inverse can easily be computed with back substitution.

In an embodiment, the methods described above are used to estimate channels in orthogonal frequency division multiplexing (OFDM).

Figure 4:
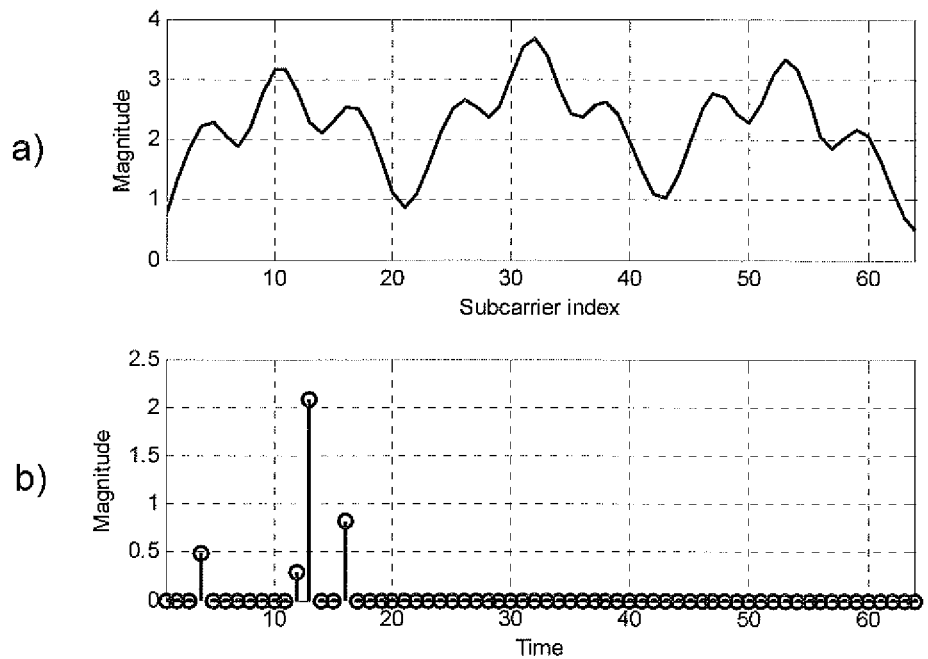
FIG. 4a shows the frequency response of a channel of an OFDM system in an embodiment
FIG. 4b shows the channel response as time domain taps calculated in an embodiment.

FIG. 4a shows the frequency response of a channel. In FIG. 4a, different frequencies or subcarriers are shown on the x-axis and the magnitude of the frequency response is shown on the y-axis.

FIG. 4b shows the channel response as time domain taps. As can be seen from FIG. 4b, the frequency response of the channel is composed of a small number of dominant time domain taps. The time domain taps therefore constitute a sparse representation of the channel response.

In an embodiment, the methods described above are used to estimate a sparse set of time domain taps from a frequency response of a channel.

Figure 5:
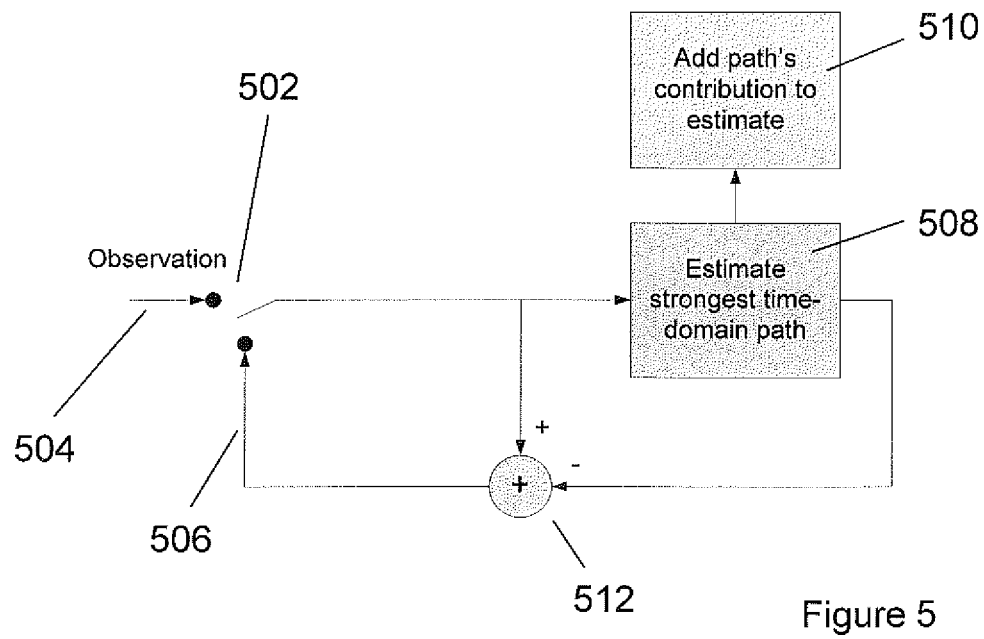
FIG. 5 shows a schematic diagram of a method of estimating the atoms or core building blocks of the input signal in an embodiment.

FIG. 5 shows a schematic diagram of a method of estimating the atoms or core building blocks of the input signal. In the case of channel estimation in OFDM, the input signal is the frequency response of a channel and the atoms are the time domain taps.

An input selection switch 502 is configured to select between an input signal or Observation 504 and a feedback loop 506. Initially the switch 502 allows the observation to enter. The strongest component of the frequency response is estimated 508 and is added to the estimate of the time domain frequency response 510. It is then subtracted from the input signal by a subtractor 512. The residual is fed back through the feedback loop 506. The switch 502 selects the signal in the feedback loop 506 as the new input, i.e., the switch allows the lower path to enter. This continues until enough components have been collected, e.g., the residual is small enough or a maximum number has been reached.

The method described above in relation to FIG. 5 may be implemented in both of User Equipment and Base Stations.

Figure 6:
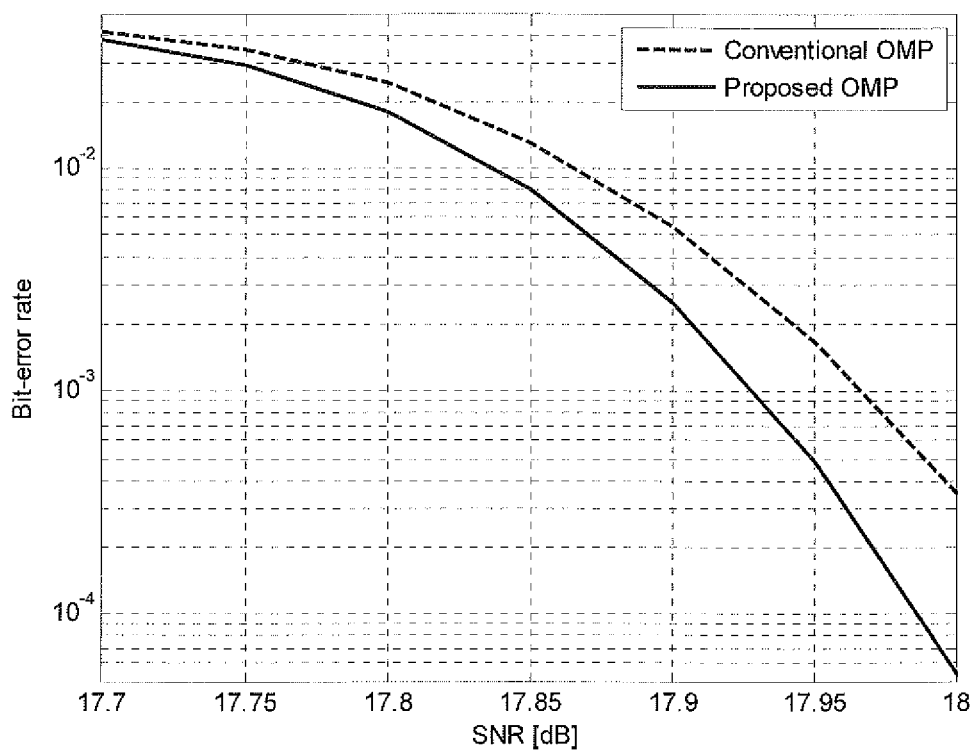
FIG. 6 shows channel estimation in the OFDM-based system in an embodiment.

FIG. 6 shows an example of channel estimation in the OFDM-based system DVB-T2 (test case VV012-64QAM45 with MISO using the DTG 0.5GI channel model) where the threshold for rejecting columns was set to 0.75.

FIG. 6 shows a comparison of the method according to embodiments described herein with conventional orthogonal matching pursuit (OMP). As can be seen, the proposed scheme performs has a lower bit error rate (BER) than conventional OMP.

Figure 7:
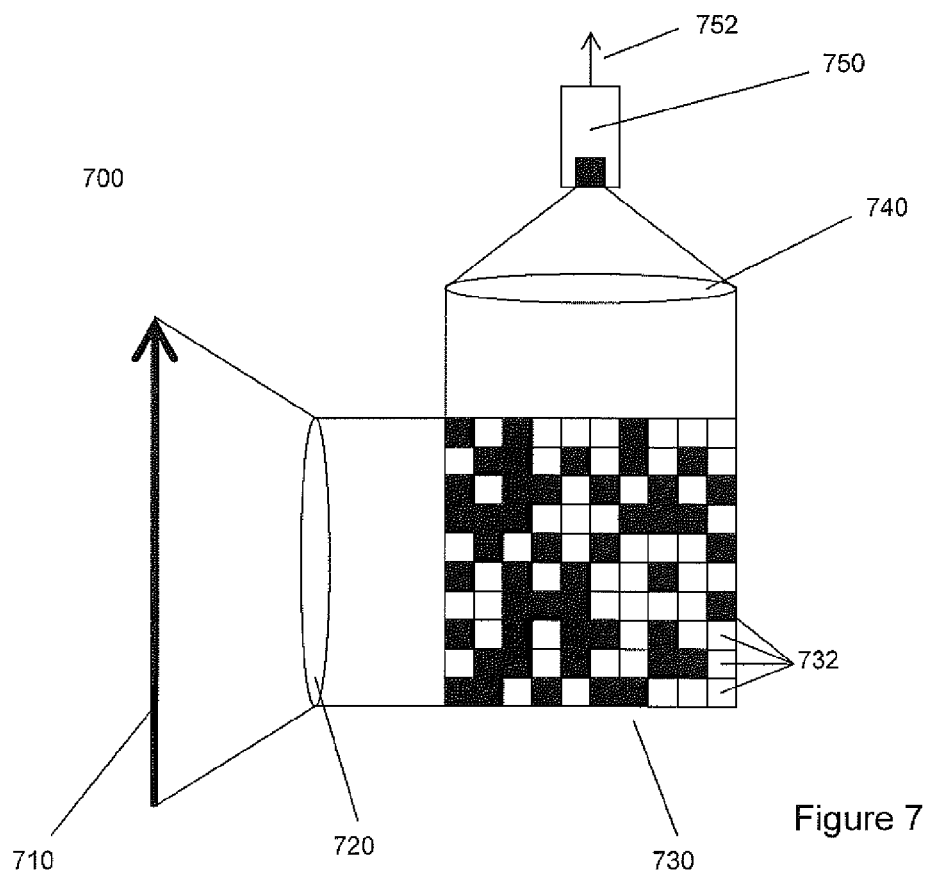
FIG. 7 shows an imaging system according to an embodiment.

FIG. 7 shows an imaging system 700 according to an embodiment. The imaging system 700 is configured as a single pixel camera. The imaging system 700 comprises a digital micro mirror device (DMD) 430. The DMD forms a pixel array of electrostatically actuated mirrors 432. Each of the mirrors can be oriented in one of two states. The two states are +12 or −12 degrees from horizontal.

A lens 420 focuses light from a subject 410 onto the DMD 430. A second lens 440 focuses light reflected by the DMD 430 onto an analogue photo sensor 450. The analogue photo sensor 450 generates an output signal 452. When coupled with the analogue photo sensor 450, the DMD 430 is used as an image sensor such that the image in question is focused onto the DMD 430 and partially reflected toward the analogue photo sensor 450. By orienting the analogue photo sensor 450 such that one of the DMD mirror states reflect light toward the photo sensor while the other mirror state reflects away, the DMD, in effect, forms an inner product between the image being acquired and the binary pattern present on the DMD array.

The process is repeated a number of times, and several measurements are taken. If the underlying image is sparse, it can be recovered from these random projections using the methods described above.

The single-pixel architecture is suited for applications where sensors are expensive compared to processing power. Such applications include non-visible wavelength sensors, e.g. infrared cameras.

In an embodiment a single pixel camera apparatus is realised by using a transmission spatial light modulator in place of the digital micro mirror device described above.

In an embodiment lighting of the subject is varied using a projector which displays patterns analogous to those used to control the micro mirror device.

In an embodiment the methods described above are used in a method of de-noising an image. The method of image de-noising removes additive noise from an image while maintaining the visual features of the image.

Figure 8:
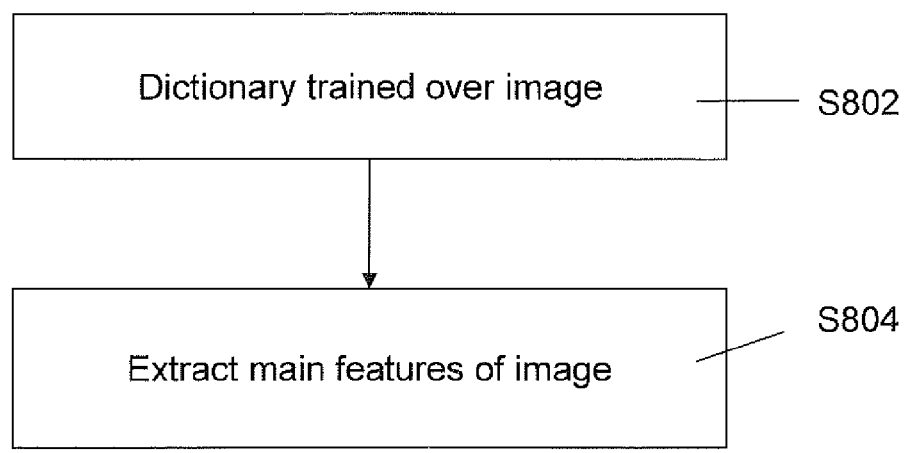
FIG. 8 shows a method of de-noising an image according to an embodiment.

FIG. 8 shows a method of de-noising an image. In step S802 a dictionary is trained over the image. The dictionary may be trained over small patches of the initial image.

Such a dictionary would be trained to yield sparse representations for a set of training image patches.

In step S804 the main features of the image are extracted. This is achieved by using the method described above in relation to FIGS. 2 and 3. A sparse signal is extracted from the image. The sparse signal captures the dominant components of the image.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes may be made without departing from the spirit of the inventions. The accompanying claims and their equivalents are intended to cover such forms or modifications as would fall within the scope and spirit of the inventions.

The invention claimed is:

1. A method of estimating a sparse signal from a measured signal using a transform matrix, the method comprising the following operations performed by a processor:
   receiving a measured signal, the measured signal derived from a sensor;
   determining a partial contribution to the sparse signal;
   determining a residual by subtracting the partial contribution from the measured signal; and
   iteratively determining further contributions to the sparse signal, wherein an iteration comprises:
      identifying a first candidate column of the transform matrix, the first candidate column being a column of the transform matrix which is most correlated with the residual at the start of the iteration;
      calculating a condition indicator, the condition indicator being an indication of a condition of a matrix formed by columns of the transform matrix selected in previous iterations and the first candidate column;
      comparing the condition indicator with a threshold;
      if the condition indicator is above the threshold, selecting the first candidate column as a selected candidate column;
      if the condition indicator is below the threshold, identifying a second column of the transform matrix as a second candidate column and selecting the second candidate column as the selected candidate column;
      determining a contribution to the sparse signal for the iteration from the selected candidate column; and
      calculating a new residual by subtracting the contribution to the sparse signal for the iteration from the residual at the start of the iteration.

2. A method according to claim 1, wherein identifying a second candidate column comprises identifying a column of the transform matrix having a condition indicator which is above the threshold.

3. A method according to claim 1, wherein identifying the first candidate column comprises calculating a measure of correlation with the residual for a plurality of columns of the transform matrix and ranking the columns of the plurality of columns according to the measure of correlation, and identifying the second candidate column comprises selecting a second column from the ranked columns.

4. A method according to claim 1, wherein determining the contribution to the sparse signal for the iteration comprises decomposing a matrix comprising a selected column into an orthogonal matrix and an upper triangular matrix.

5. A method according to claim 4, wherein the condition indicator is calculated from the norm of the projection of the candidate column onto the null space of the selected columns.

6. A method according to claim 1 further comprising determining if a stopping criterion has been met and if the stopping criterion has been met, outputting the sparse signal.

7. A method of estimating a channel as a set of time domain taps from a signal received over the channel, comprising the method of claim 1, wherein the measured signal is received over the channel and the sparse signal is the set of time domain taps.

8. A method of processing a measured signal from a sensor, the method comprising:
   receiving the measured signal from the sensor;
   processing the measured signal using the method of claim 1; and
   outputting the sparse signal.

9. A method according to claim 8 wherein the sensor is a photo detector and the transform matrix is determined from a light field being imaged by the photo detector.

10. An image de-noising method comprising the method of claim 1.

11. An image de-noising method according to claim 10, further comprising determining the transform matrix from an image or an image patch.

12. A non-transitory computer readable carrier medium carrying processor executable instructions which when executed on a processor cause the processor to carry out a method according to claim 1.

13. A signal processing apparatus comprising
   an input module configured to receive a measured signal, the measured signal derived from a sensor;
   an output module configured to output a sparse signal;
   a memory configured to store a transform matrix; and
   a processor configured to estimate the sparse signal from the measured signal by:
   determining a partial contribution to the sparse signal;
   determining a residual by subtracting the partial contribution from the measured signal; and
   iteratively determining further contributions to the sparse signal, wherein an iteration comprises:
      identifying a first candidate column of the transform matrix, the first candidate column being a column of the transform matrix which is most correlated with the residual at the start of the iteration;
      calculating a condition indicator, the condition indicator being an indication of a condition of a matrix formed by columns of the transform matrix selected in previous iterations and the first candidate column;
      comparing the condition indicator with a threshold;
      if the condition indicator is above the threshold, selecting the first candidate column as a selected candidate column
      if the condition indicator is below the threshold, identifying a second column of the transform matrix as a second candidate column and selecting the second candidate column as the selected candidate column;
      determining a contribution to the sparse signal for the iteration from the selected candidate column; and
      calculating a new residual by subtracting the contribution to the sparse signal for the iteration from the residual at the start of the iteration.

14. A signal processing apparatus according to claim 13 wherein the input module is configured to receive an indication of a signal received over a communication channel, and the processor is configured to determine a set of time domain taps as the sparse signal.

15. A base station comprising a signal processing apparatus according to claim 14.

16. A mobile station comprising a signal processing apparatus according to claim 14.

17. An imaging apparatus comprising
   a single pixel sensor configured generate a signal depending on a light field originating from a selection of locations on a subject; and
   a signal processing apparatus according to claim 13 configured to receive the signal generated by the single pixel sensor.

18. An imaging apparatus according to claim 17 further comprising a spatial light modulator configured to modulate a light field received by the single pixel sensor.

19. An image processing system comprising the signal processing apparatus of claim 13, wherein the input module is operable to receive an input image and the processor is operable to de-noise the input image.

20. An image processing system according to claim 19, wherein the processor is further operable to determine the transform matrix from the input image or an image patch of the input image.

* * * * *